United States Patent

[11] 3,592,151

| [72] | Inventor | John J. Webber |
| | | Westboro, Mass. |
| [21] | Appl. No. | 17,854 |
| [22] | Filed | Mar. 9, 1970 |
| [45] | Patented | July 13, 1971 |
| [73] | Assignee | Morgan Construction |
| | | Worcester, Mass. |

[54] METHOD AND APPARATUS FOR REFUSE INCINERATION
10 Claims, 5 Drawing Figs.

| [52] | U.S. Cl. | 110/8 E |
| [51] | Int. Cl. | F23g 5/10 |
| [50] | Field of Search | 110/8, 8 E, 7, 8 B, 18, 18 E |

[56] References Cited

UNITED STATES PATENTS

| 3,417,717 | 12/1968 | Jacobovici | 110/18 X |
| 3,481,290 | 12/1969 | Wunderley | 110/8 |
| 3,527,178 | 9/1970 | Southwick | 110/8 |

FOREIGN PATENTS

| 1,104,605 | 2/1968 | Great Britain | 110/8 |

*Primary Examiner*—Kenneth W. Sprague
*Attorney*—Chittick, Pfund, Birch, Samuels & Gauthier ABSTRACT: A method and apparatus for high-temperature incineration of refuse containing a random mixture of inert and combustible materials. The apparatus includes a combustion chamber having a tank at its base containing a high-temperature molten slag bath. The refuse, which may be initially subjected to drying and partial incineration in an auxiliary furnace, is deposited directly onto the surface of the molten slag bath. The combustible materials in the refuse are rapidly and completely incinerated either as they drop through the chamber, or as they subsequently float on the surface of the molten bath. The inert materials in the refuse are melted in the molten bath, thereby adding to the slag content of the tank while at the same time producing a small volume of molten metal which sinks to the bottom of the tank where it is eventually tapped off.

INVENTOR.
JOHN J. WEBBER
BY
Chittick, Pfund, Birch, Samuels & Gauthier
ATTORNEYS

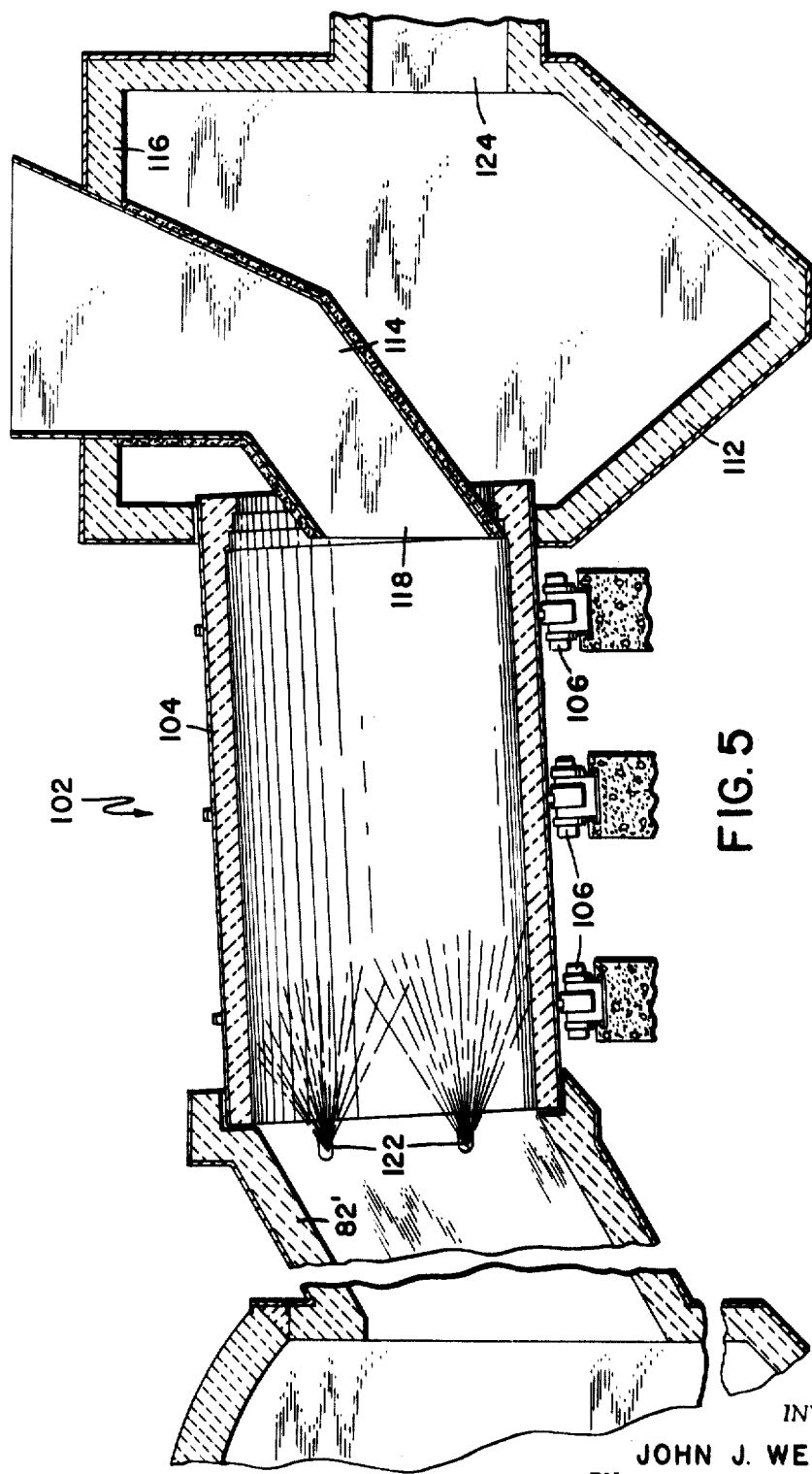

3,592,151

METHOD AND APPARATUS FOR REFUSE INCINERATION

DESCRIPTION OF THE INVENTION

This invention relates to an improved method and apparatus for incinerating refuse containing a random mixture of combustible and inert material, and more particularly to a slag-type incinerator which reduces the refuse to hot flue gas and a molten residue of slag and metal.

As herein employed, the term "refuse" is used in a generic sense and includes all types of solid wastes, including garbage, rubbish, ashes, municipal sweepings and collections, etc.

The municipal and industrial incinerators which have heretofore been developed usually employ grates to support the refuse during incineration. Experience has indicated, however, that these grates are a continuing source of problems. For example, the grates exhibit a tendency to distort or disintegrate after relatively short periods of exposure to high-temperature operating conditions. The grates also become fouled and plugged by melting metal and glass in the burning refuse. Accordingly, frequent repair and/or replacement of the grates is required, with attendant labor and equipment costs as well as extended periods of downtime occasioned by the necessity of having to completely shut down and cool the equipment before work can be performed by maintenance personnel. These problems promise to become even more acute due to ever-increasing temperature requirements coupled with an increasing percentage of metal and glass in the refuse being collected at industrial and municipal disposal sites.

Improvements in grate designs have not kept pace with the above-mentioned problems, thus necessitating comprises in the operating efficiency of incinerators. Such comprises include operating at temperatures lower than that required to consume all of the combustibles in the refuse so as to avoid damaging or fouling the grates with melting glass and metal. Another compromise is to sort out the bulk of the glass or metal prior to incineration. Both of these alternatives produce unsatisfactory results because of the resulting large quantities of solid residues which must still be handled and disposed of.

Accordingly, it is a general object of the present invention to provide an improved method and apparatus for high-temperature refuse incineration which obviates the above-mentioned problems.

Another object of the present invention is to provide a highly efficient means for continuously incinerating refuse, which means avoids the use of conventional grates and instead, employs a molten high-temperature slag tank, at the base of the incinerator.

A further object of the present invention is to provide means submerged in the slag tank for maintaining the same in a molten condition prior to and during incineration of refuse being deposited in the incinerator.

Another object of the present invention is to provide means for providing a constant supply of air to the bottom of the refuse deposited in the molten slag bath.

Another object of the present invention is to provide means at the base of the slag tank for tapping off molten metal resulting from the incineration process.

These and other objects and advantages of the present invention will become more apparent as the description proceeds with the aid of the accompanying drawings in which.

Figure 1:
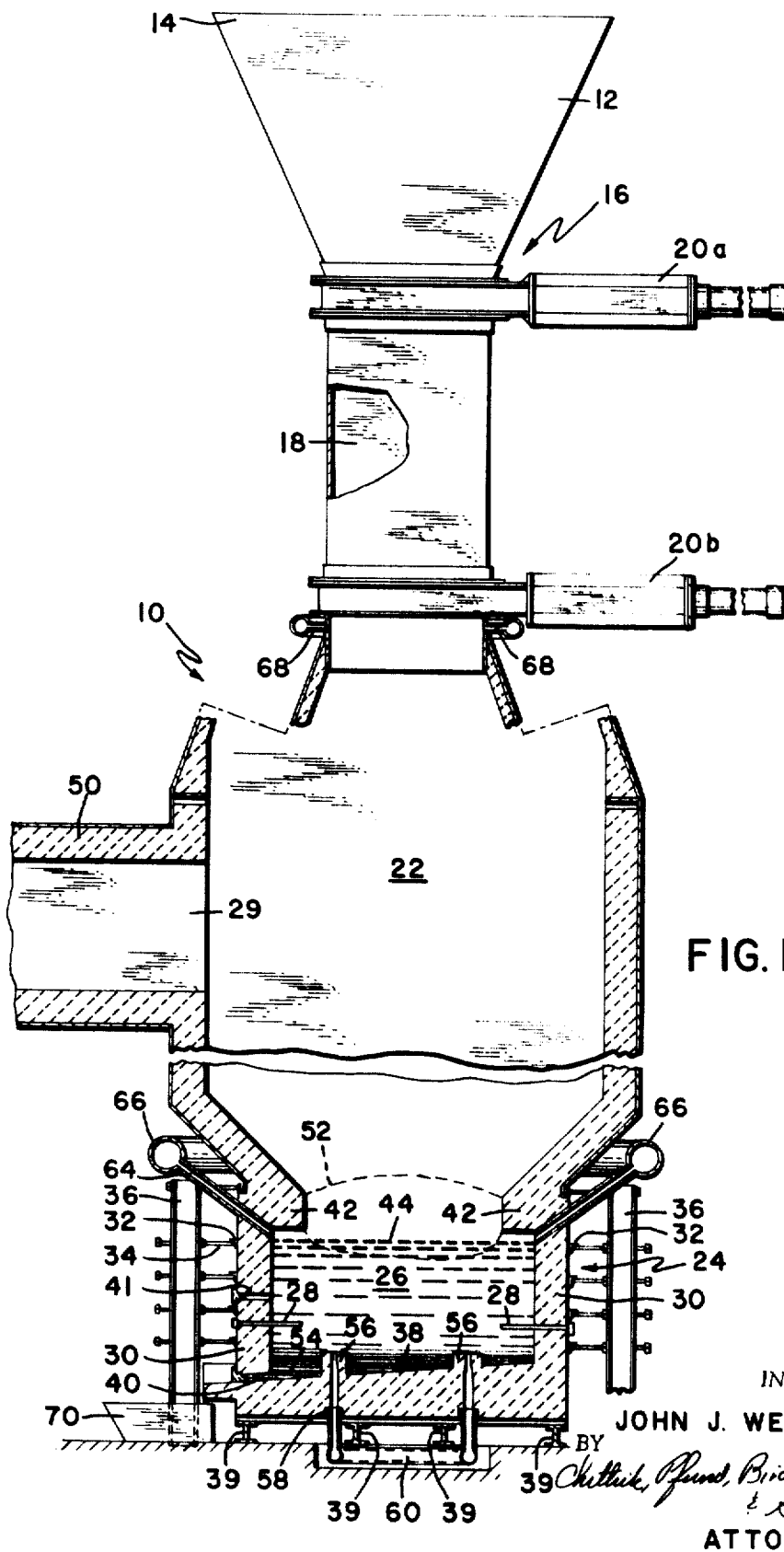
FIG. 1 is a vertical sectional view of one embodiment of the slag-type incinerator employing the concepts of the present invention.
Figure 2:
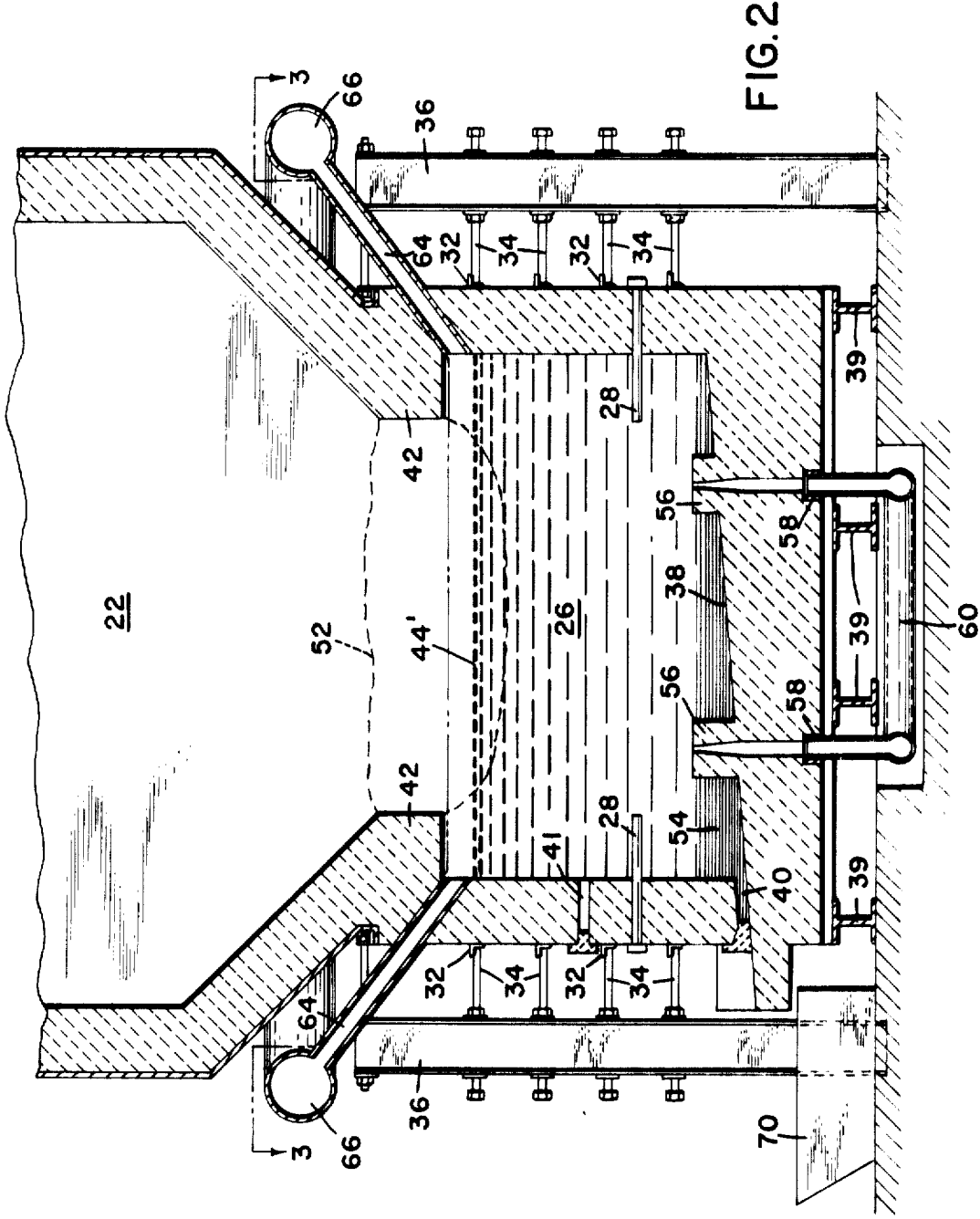
FIG. 2 is an enlarged vertical sectional view of the slag tank at the base of the incinerator.
Figure 3:
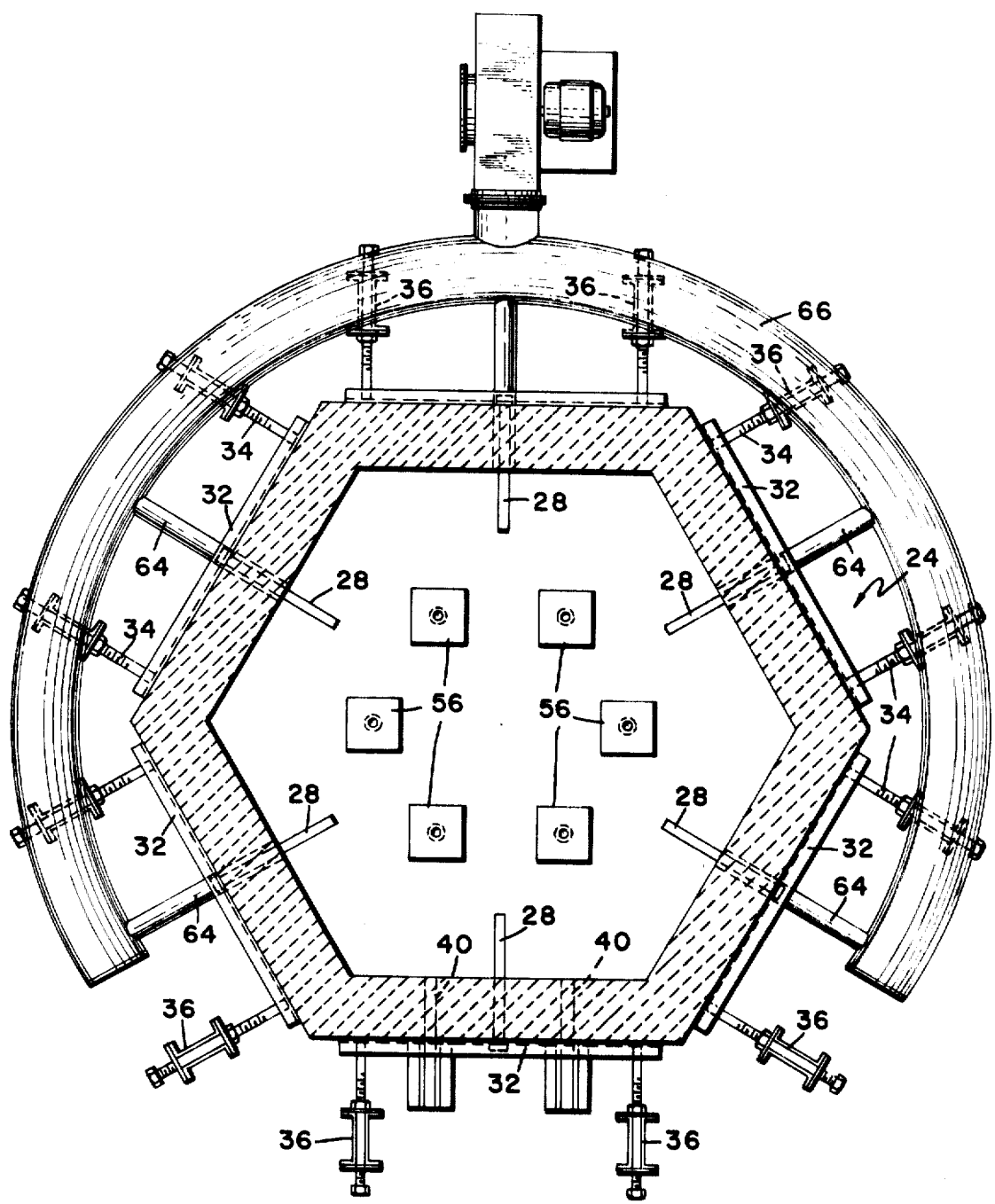
FIG. 3 is a horizontal sectional view taken along line 3—3 of FIG. 2.

Referring initially to FIGS. 1—3 of the drawings, there is shown at 10 one embodiment of an incinerator according to the present invention. Beginning at the upper end, the incinerator is provided with a receiving hopper 12 which is open at the top as at 14 to receive raw refuse from any convenient loading means such as for example a clamshell crane or belt conveyor. Hopper 14 tapers downwardly and is in communication at its lower end with an air lock assembly generally indicated at 16. Although not considered as a necessary feature in all installations, the air lock assembly is helpful in preventing escape of the hot gaseous products of combustion through the loading hopper. The air lock assembly includes an intermediate chamber 18 separated from the receiving hopper 14 by an upper gate member 20a and from the underlying main combustion chamber 22 by a lower gate member 20b.

A slag tank 24 underlies the main combustion chamber at the base of the incinerator. Tank 24 is adapted to contain a molten slag bath 26 of a suitable heat sink material. At initial startup, the bath may comprise molten glass which subsequently absorbs and becomes intermixed with the molten slag byproducts of the refuse being incinerated. The slag is preheated to a molten state prior to commencing the incineration process. This may be accomplished by any suitable means, such as for example by employing a plurality of oppositely disposed electrodes 28 connected to an external power source (not shown). To accommodate proper positioning of the electrodes, the slag tank 24 may be conveniently provided with oppositely disposed sidewalls 30 through which the electrodes protrude into the heat sink material. In the embodiment herein under consideration, the slag tank is provided in plan view with a hexagonal configuration, and a total of six electrodes are employed. It will, however, be understood that both the shape of the tank and the number of electrodes may be varied without departing from the invention. Alternate means other than or in addition to electrodes may also be employed to heat the slag bath. Such alternate means might include oil or gas burners firing either from submerged locations directly into the slag, or downwardly from positions above the surface of the slag.

In the embodiment herein illustrated, the base of the incinerator rests on spaced support members, for example I-beams 39, which accommodate air circulation therebetween. Vertical stability is imparted by angle members 32 on the sidewalls 30 of the slag tank which in turn rest on support bolts 34 extending radially inwardly from posts 36. The support bolts are adjustable axially to accommodate thermal expansion and contraction of the walls 30. The bottom 38 of the slag tank preferably slopes towards a taphole 40 in one of the wall sections 30.

In order to protect the inwardly protruding electrodes 28 from possible damage caused by rapidly sinking heavy inert objects, an overhanging protective shelf 42 is provided at a level above that of the surface 44 of the molten slag bath 26.

The wall surrounding the main combustion chamber 22 is further provided with an opening 29 leading to a conduit 50 through which the gaseous products of combustion may be exhausted. Although not shown, it will be understood that suitable heat exchangers, secondary combustion means and other gas-cleaning equipment may be located in conduit 50.

The incinerator 10 operates in the following manner: the slag 26 is initially heated to a molten state by employing the submerged electrodes 28. As previously indicated, alternative or auxiliary means such as for sample gas or oil burners might also be employed to accomplish this initial step. When the slag bath has reached the desired temperature, considered at present to be in the range of 2,600° F., the incinerator is ready to receive an initial charge of refuse. Prior to or at this time, the upper gate member 20a is opened while allowing the lower gate member 20b to remain closed. Thereafter, an amount of refuse which is preferably sufficient to all but fill chamber 18 is loaded through receiving hopper 14. As previously indicated, the refuse will contain a random mixture of inert and combustible materials. The inerts will include glass, metal, ceramics, stones, ashes, etc. and the combustibles will be made up of paper, wood, light plastics, etc. The upper gate member 20a is next closed and the lower gate member opened, with the result that the refuse material is dropped downwardly through the combustion chamber to a position on the slag bath indicated in dotted at 52. The dry combustibles will ignite immediately upon entering the combustion chamber because of the high temperature maintained therein. Other heavier combustibles that do not ignite immediately will fall onto the surface of the slag bath 26 where they will float and rapidly become completely consumed. Noncombustibles such as metal cans, bottles, etc. will eventually melt in the molten bath 26. Any resulting molten metal will sink through the slag to the sloping floor 38 where it will collect in a shallow pool as at 54. The nonmetallic molten byproducts of the incineration process will become intermixed with and thus add to the total volume of slag 26 in the tank 24.

Means are provided for insuring an adequate supply of combustion air to the chamber 22. Such means may include a plurality of nozzles 56 in the floor 38. The discharge ends of the nozzles protrude from the sloping floor surface to a level above that of the shallow molten metal pool accumulating at 54. The nozzles are each connected as at 58 to a manifold 60 which is in turn connected to an external source of pressurized air (not shown).

Air will emerge from the nozzles 56 and rise rather rapidly to the surface of the slag bath. Because the nozzle tips extend above the sloping floor 38, the molten metal accumulating at 54 will remain relatively undisturbed The rising air bubbles will also pick up heat from the high-temperature molten slag, thereby increasing combustion efficiency in chamber 22. As the air bubbles reach the surface 44 of the molten slag, they will burst and promote further agitation tending to break up the mass of refuse deposited at 52.

Other sources of combustion air may also be required. To this end, the incinerator walls may be provided with additional air inlets which direct airstreams downwardly towards the surface 44 of the molten bath. The inlets may be connected to a common exterior manifold 66. If desired, either or both of the manifolds 60 and 66 may draw preheated air from a heat exchanger (not shown) located in exhaust conduit 50. Still another source of combustion air may take the form of inlets or nozzles 68 located adjacent to the underside of the lower gate member 20b. Incoming airflow at this location will serve the added function of continuously cooling the overlying gate member.

The burning combustibles in chamber 22, particularly those that burn while floating on the surface of the molten bath 26, generate further heat which assists in maintaining the slag bath at the desired elevated temperature. While the refuse deposited at 52 is being consumed, another charge of refuse material is loaded into chamber 18. At the appropriate time, when the refuse material at 52 has been substantially consumed, the next charge is deposited and the incineration process is continued.

At appropriate times, the accumulation of molten metal residue at 54 is drained off through a taphole 40 into a suitable receptacle 70. Other tapholes, for example at 41, may also be used to drain off some of the molten slag as the volume of the slag bath is gradually increased by the nonmetallic molten byproducts of the refuse being processed.

Under certain operation conditions, where for example the raw refuse has a high water content, or where the refuse is chilled or frozen due to exposure to low-temperature environmental conditions, it may not be possible to deposit this material directly onto the surface of the molten slag bath without producing a chilling effect which in turns has the undesirable effect of reducing the current-carrying capacity of the slag. Accordingly, it may be desirable to dry and/or partially incinerate the refuse prior to depositing the same onto the surface of the molten slag bath.

Figure 4:
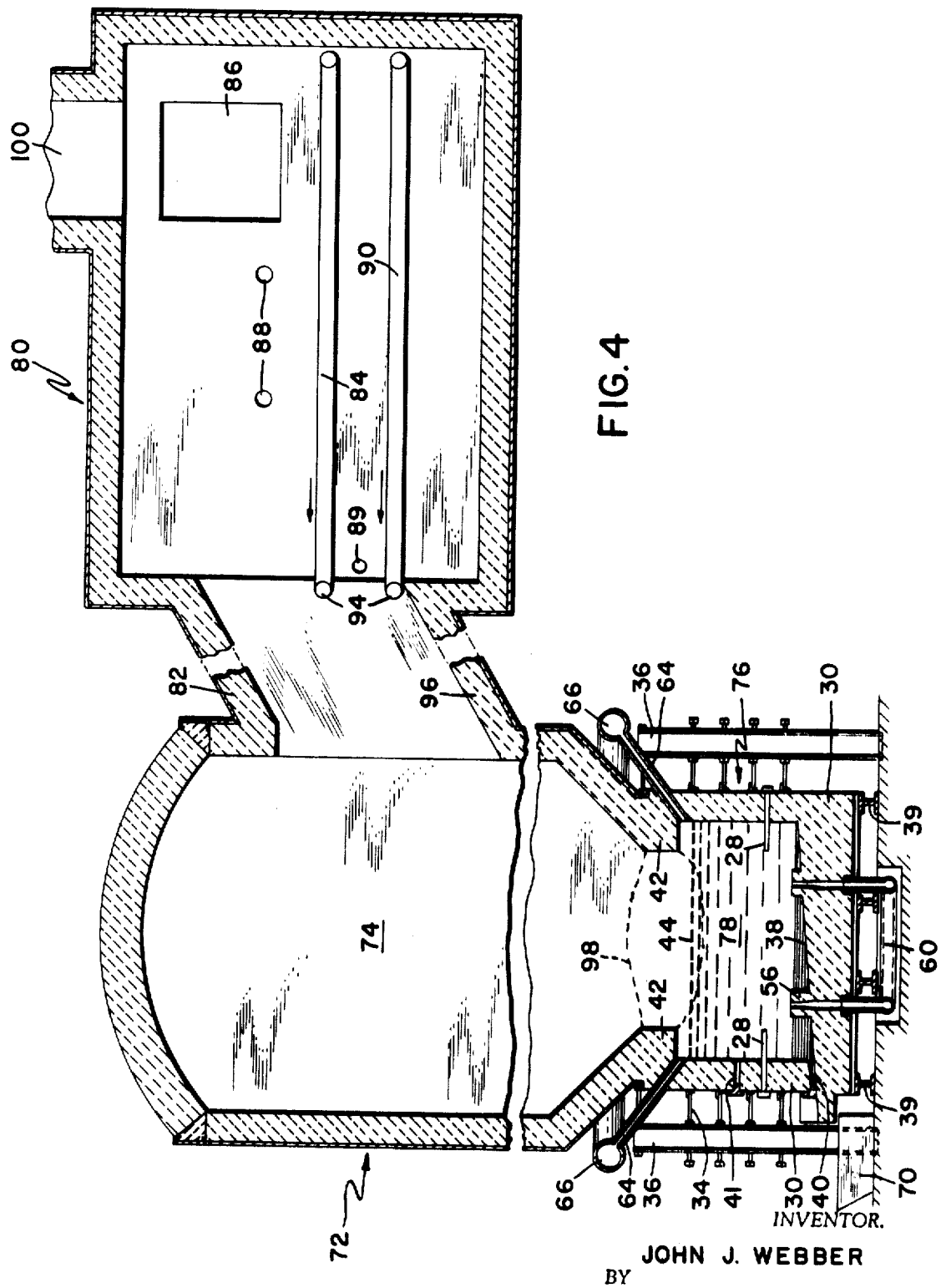
FIG. 4 is a vertical sectional view of an alternate embodiment of the invention employing a grate-type auxiliary furnace; and, FIG. 5 is a vertical sectional view of a rotary kiln auxiliary furnace.

To this end, and with particular reference to FIG. 4, there is shown an alternate embodiment of the invention wherein slag-type incinerator similar to that shown in FIGS. 1—3 is again provided at 72. The incinerator has a combustion chamber 74 and a slag tank 76 substantially identical to the tank 24 previously described. Slag tank 76 contains a bath of molten slag 78 which is preheated by means of electrodes 28, with combustion air being supplied by sumbmerged nozzles 58 and in addition, by downwardly directed inlets 64.

The installation depicted in FIG. 4 differs primarily in the means for charging refuse into the combustion chamber 74. This is accomplished by means of an auxiliary furnace 80 which is connected to the incinerator 72 by an intermediate downwardly sloping conduit 82. The auxiliary furnace 80 is provided with a continuously moving grate conveyor 84 onto which raw refuse is deposited through a charging door 86. When initially starting the apparatus, the refuse deposited on grate conveyor 84 may be ignited by any convenient means, such as for example gas or oil burners indicated typically at 88. Any resulting ashes or other particulate residue drops through the grate conveyor 84 onto a second underlying conveyor 90 which moves in the same direction towards the receiving end of conduit 82.

The operating temperature in auxiliary furnace 80 is sufficiently low so that damage to the conveyors 84 and 90 is avoided. This operating temperature is below that at which inert materials such as glass, metal, etc. begins to melt, but sufficiently elevated so that some of the combustibles are ignited, with the major portion of the combustibles are ignited, with the major portion of the combustibles being heated to a temperature approaching the ignition temperature of charcoal in air (approximately 900° F.).

The delivery ends 94 of both conveyors 84 and 90 are positioned such that the preheated and partially ignited refuse is delivered downwardly onto the sloping floor 96 to conduit 82. The inclination of floor 96 is such that the refuse slides into the combustion chamber 74 of incinerator 72 where it accumulates as at 98 on the surface of the molten glass bath 78. From this point on, operation of incinerator 72 is substantially identical to that of the incinerator 10 shown in FIGS. 1—3. The gaseous products of combustion from chamber 74 pass through conduit 82 and auxiliary furnace 80 and are then exhausted through a conduit or stack 100, which again may be provided with suitable heat exchangers, secondary combustion chambers and other gas-cleaning equipment. Once the incineration process is underway, the hot gases escaping through the auxiliary furnace 80 will be sufficiently hot to ensure drying and partial incineration of the raw refuse material being deposited on conveyor 84. When this condition is reached, the operation of burners 88 may be discontinued. Temperature control in furnace 80 may be maintained by adding either preheated or cool combustion air at a convenient location, for example as at 89.

By partially incinerating and preheating the refuse material in an auxiliary furnace 80, subsequent surface chilling of the molten bath 78 and the problems occasioned by such chilling are avoided.

Referring now to FIG. 5, there is shown at 102 another embodiment of an auxiliary furnace which may be employed in conjunction with a slag incinerator of the type shown in FIG. 4. Furnace 102 is of the rotary kiln design and consists essentially of a cylindrical refractory-lined combustion chamber 104 which is rotated about an inclined axis by means of suitable gear drives 106 having drive pinions which mesh with annular racks 108 on the exterior of the chamber. One end of the rotating combustion chamber is in communication as at 110 with a downwardly sloping conduit 82' similar to the conduit 82 shown in FIG. 4. The other end of the rotating combustion chamber 104 extends into an enclosed ash hopper 112. A loading chute 114 is supported in the ash hopper 112. One end of the loading chute extends upwardly through the top 116 of the ash hopper, and the other end 118 of the loading chute extends into the rotating combustion chamber 104.

Refuse is loaded into the chute 114 by any convenient means and allowed to drop into the higher end of the inclined rotating combustion chamber 104. The inclination of the chamber is such that the refuse is caused to move towards the receiving end of conduit 82' as the chamber continues to rotate.

At startup, means such as for example burners 122 may be employed to ignite the incoming refuse. However, it is expected that the hot gases flowing through conduit 82', chamber 104 and then out through the ash hopper 112 and its associated exhaust stack 124 will suffice to preheat and partially ignite the refuse moving through chamber 104.

Having thus described several representative embodiments of the invention, the advantages to be derived therefrom will now be better understood by those skilled in the art. Among these advantages is the substitution of a molten slag bath for the more conventional troublesome grate systems. This allows the incineration process to be carried on at elevated temperatures which were heretofore impossible to maintain without resulting damage to the equipment employed. By operating at higher temperatures, the refuse is completely reduced to hot gases, molten slag and molten metal. The volumes of molten slag and metal are small in comparison to residues from conventional incinerators, and are thus much easier and less expensive to dispose of.

It is my intention to cover all changes and modifications of the embodiments herein disclosed which do not depart from the spirit and scope of the invention as defined by the following claims.

I claim:

1. A method of processing refuse containing a random mixture of combustible and inert materials comprising:
   a. preheating a suitable slag material in a combustion chamber to produce a molten slag bath at the base of said chamber;
   b. depositing a charge or refuse onto the surface of said molten slag bath, the ambient temperature in said combustion chamber and the temperature of said molten slag bath being sufficiently elevated to incinerate the combustible materials and to melt the inert materials with any metallic molten residue accumulating at the base of said chamber,
   c. supplying heated combustion air to said chamber by introducing air at the base of said chamber beneath the surface of said molten slag bath and allowing the air to rise to the surface of said slag bath, and,
   d. controlling the depth of said molten slag bath.

2. The method as claimed in claim 1 further characterized by supplying additional combustion air to said chamber, the said additional air being under sufficient pressure and directed downwardly towards the surface of said molten bath and the refuse floating therein.

3. The method as claimed in claim 1 wherein the depth of said molten bath is additionally controlled by tapping molten slag from said chamber.

4. The method as claimed in claim 1 wherein the refuse is subjected to partial incineration in an auxiliary furnace prior to being charged into said combustion chamber.

5. The method as claimed in claim 4 wherein the refuse is exposed to the hot gaseous products of combustion produced in said combustion chamber.

6. Apparatus for processing refuse containing a random mixture of combustible and inert materials comprising:
   a. means defining a furnace chamber,
   b. a supply of slag material located at the base of said chamber,
   c. heating means for heating said slag material to convert the same to a molten bath, said heating means being positioned at a level beneath the surface of said bath,
   d. means for depositing a charge of waste material onto the surface of said molten slag bath, the ambient temperature in said chamber and the temperature of said molten slag bath being sufficiently elevated to incinerate the combustible material in said charge and to melt the inert materials in said charge with any molten metal residue being ultimately collect at the base of the chamber,
   e. means for supplying heated combustion air to said chamber by introducing air at the base of said chamber beneath the surface of said bath and allowing the air to rise to the surface of said bath, and
   f. means for tapping off the metal molten residue collected at the base of said chamber.

7. The apparatus as set forth in claim 6 wherein the means defining said furnace chamber includes a bottom member, a wall member extending upwardly from said bottom member, and a roof member supported by said wall member at a position spaced vertically from and overlying said bottom member.

8. The apparatus as claimed in claim 7 wherein said means for depositing a charge of waste material in said furnace includes a vertical loading duct communicating with an opening in said roof member, a pair of vertically spaced gate members in said duct, said gate members, when in the closed position, cooperating with said duct to define a loading chamber, means for depositing a charge of waste material in said loading chamber when the uppermost of said gate members is in the open position and the lowermost gate member is closed, whereupon a reverse adjustment of said gate members will result in said charge being deposited in said chamber, with said uppermost gate member preventing escape of heated air and combustion gases through said loading duct.

9. The apparatus as claimed in claim 7 further characterized by additional means in said wall member directing a flow of combustion air downwardly towards the surface of said molten bath.

10. The apparatus as claimed in claim 6 further characterized by auxiliary furnace means for preheating and partially incinerating the refuse prior to charging the same into said furnace chamber.

PO-1050
(5/69)

UNITED STATES PATENT OFFICE
CERTIFICATE OF CORRECTION

Patent No. 3,592,151          Dated July 13, 1971

Inventor(s) John J. Webber

It is certified that error appears in the above-identified patent and that said Letters Patent are hereby corrected as shown below:

Col. 1, line 33 "comprises" should be --compromises--

Col. 1, line 34, "comprises" should be --compromises--

Col. 3, line 37, after "inlets" insert --64--

Col. 4, lines 27-28, delete "are ignited, with the major portion of the combustibles"

Signed and sealed this 15th day of February 1972.

(SEAL)
Attest:

EDWARD M. FLETCHER, JR.          ROBERT GOTTSCHALK
Attesting Officer          Commissioner of Patents